(12) United States Patent
Godal (10) Patent No.: US 11,325,829 B2
(45) Date of Patent: May 10, 2022

(54) PROCESS AND APPARATUS FOR DECOMPOSING A HYDROCARBON FUEL

(71) Applicant: XGas AS, Fana (NO)

(72) Inventor: Arne Godal, Fana (NO)

(73) Assignee: XGAS AS, Fana (NO)

( * ) Notice: Subject to any disclaimer, the term of this patent is extended or adjusted under 35 U.S.C. 154(b) by 465 days.

(21) Appl. No.: 16/318,960

(22) PCT Filed: Jul. 21, 2017

(86) PCT No.: PCT/EP2017/068555
§ 371 (c)(1),
(2) Date: Jan. 18, 2019

(87) PCT Pub. No.: WO2018/015564
PCT Pub. Date: Jan. 25, 2018

(65) Prior Publication Data
US 2019/0218094 A1 Jul. 18, 2019

(30) Foreign Application Priority Data
Jul. 22, 2016 (GB) ..................................... 1612776

(51) Int. Cl.
*C01B 3/24* (2006.01)
*B01J 8/02* (2006.01)
(Continued)

(52) U.S. Cl.
CPC ............... *C01B 3/24* (2013.01); *B01J 8/0285* (2013.01); *B01J 19/02* (2013.01);
(Continued)

(58) Field of Classification Search
CPC ................................ C01B 3/24; B01J 8/0285
(Continued)

(56) References Cited

U.S. PATENT DOCUMENTS

| 3,619,140 A | 11/1971 | Morgan et al. |
|---|---|---|
| 4,042,334 A | 8/1977 | Matovich |

(Continued)

FOREIGN PATENT DOCUMENTS

| AU | 26191 | 9/1972 |
|---|---|---|
| DE | 10 2014 018 471 | 6/2016 |

(Continued)

OTHER PUBLICATIONS

International Search Report and Written Opinion of the International Searching Authority, dated Nov. 7, 2017 in corresponding International Patent Application No. PCT/EP2017/068555.

(Continued)

*Primary Examiner* — Douglas B Call
(74) *Attorney, Agent, or Firm* — Wenderoth, Lind & Ponack, L.L.P.

(57) ABSTRACT

The invention relates to a method for producing hydrogen gas and optionally a carbonaceous product from a hydrocarbon fuel, comprising:
  introducing a flowing stream of said fuel into a reaction chamber of a reactor, wherein said reaction chamber has at least one wall and a heating zone which is heated by a heat source,
  heating said fuel in said heating zone to effect pyrolytic decomposition of said hydrocarbon fuel to produce said hydrogen gas and optionally said carbonaceous product;
  wherein the ratio of C:O (mol/mol) in the reaction chamber is greater than 20:1; and
  characterized in that the heat source heats the hydrocarbon fuel in the heating zone by radiated heat to an average temperature of greater than 2000° C.
The invention also relates to an apparatus for carrying out the method of the invention.

29 Claims, 3 Drawing Sheets

(51) Int. Cl.
*B01J 19/02* (2006.01)
*C09C 1/48* (2006.01)

(52) U.S. Cl.
CPC ........... *B01J 2219/00094* (2013.01); *B01J 2219/1943* (2013.01); *C01B 2203/0805* (2013.01); *C01B 2203/085* (2013.01); *C09C 1/487* (2013.01)

(58) Field of Classification Search
USPC ............................................ 423/650
See application file for complete search history.

(56) References Cited

U.S. PATENT DOCUMENTS

| | | | |
|---|---|---|---|
| 5,527,518 A | 6/1996 | Lynum et al. | |
| 6,653,005 B1 * | 11/2003 | Muradov | B01J 8/0278 |
| | | | 429/410 |
| 7,097,822 B1 | 8/2006 | Godal et al. | |
| 2003/0182861 A1 | 10/2003 | Weimer et al. | |
| 2007/0186470 A1 * | 8/2007 | Ennis | C10G 9/24 |
| | | | 48/61 |

FOREIGN PATENT DOCUMENTS

| | | |
|---|---|---|
| EP | 0 209 800 | 1/1987 |
| EP | 0 360 399 | 3/1990 |
| GB | 963526 | 7/1964 |
| GB | 1 242 391 | 8/1971 |
| GB | 2 418 672 | 4/2006 |
| JP | 2011-126765 | 6/2011 |
| WO | 93/12030 | 6/1993 |
| WO | 93/20152 | 10/1993 |
| WO | 94/14899 | 7/1994 |
| WO | 99/58614 | 11/1999 |
| WO | 00/21878 | 4/2000 |
| WO | 2010/127961 | 11/2010 |
| WO | 2015/082689 | 6/2015 |

OTHER PUBLICATIONS

Rodat et al., "Kinetic modelling of methane decomposition in a tubular solar reactor", Chemical Engineering Journal, 146(1): 120-127 (2009).
Search Resort dated Jan. 12, 2017 in British Patent Application No. GB 1612776.3.

* cited by examiner

PROCESS AND APPARATUS FOR DECOMPOSING A HYDROCARBON FUEL

FIELD

The present invention relates to a process for decomposing a hydrocarbon fuel to form a hydrogen gas and optionally a carbonaceous product. The invention also relates to an apparatus in which the process of the invention can be carried out.

BACKGROUND

Natural gas and several of its derivatives are most commonly used for energy purposes by conversion to heat and electricity. With few exceptions, this conversion is started with a combustion process, where the so-called heating value of a fuel gas is released by converting the hydrogen and the carbon in the fuel gas into water vapour and $CO_2$. The oxygen necessary to perform this reaction is typically derived from the atmosphere. Natural gas normally contains more than 80% methane and thus combustion may be represented by the overall reaction equation:

$$CH_4 + 2O_2 \rightarrow CO_2 + 2H_2O$$

This combustion provides a heating value of 50,000 kJ/kg of methane. However, a major disadvantage with this combustion is the production of $CO_2$ which is detrimental to the environment.

Hydrogen is an attractive fuel source since it is lightweight, provides a high energy return for its mass (120,000 kJ/kg) and produces a harmless combustion product (water vapour). However, hydrogen does not occur in significant amounts in the atmosphere and therefore has to be produced.

The vast majority of the world's current hydrogen needs is met by steam reforming of hydrocarbons. This process can be represented by the reaction (for methane):

$$CH_4 + 2H_2O \rightarrow 4H_2 + CO_2 \qquad (I)$$

Methane and hydrogen have approximate heating values of 50,000 kJ/kg and 120,000 kJ/kg, respectively. Process (I) therefore provides a heating value of 10,000 kJ/kg $CH_4$, or viewed alternatively, 5.56 kWh/kg $H_2$ produced. However, 5.5 kg of $CO_2$ is released for each kg of $H_2$ produced.

Hydrogen can also be produced by electrolysis of water, which can be represented by the reaction:

$$2H_2O \rightarrow 2H_2 + O_2 \qquad (II)$$

Hydrogen has an approximate heating value of 120,000 kJ/g. Process (II) therefore provides a heating value of 13,200 kJ/kg $H_2O$, or viewed alternatively, 3.67 kWh/kg $H_2O$, or viewed alternatively 33.33 kWh/kg $H_2$ produced.

Hydrogen can also be produced by thermal decomposition of hydrocarbons, which can be represented by the reaction (for methane):

$$CH_4 \rightarrow C + 2H_2 \qquad (III)$$

Methane, carbon and hydrogen have approximate heating values of 50,000 kJ/kg, 33,000 kJ/kg and 120,000 kJ/kg, respectively. Process (III) therefore provides a heating value of 4,750 kJ/kg $CH_4$, or viewed alternatively, 5.28 kWh/kg $H_2$ produced (if the carbon produced is combusted). This is a similar value to the value for process (I). Process (III) also produces 3 kg of industrially useful carbon black per kg/hydrogen produced and $CO_2$ production may be avoided by not combusting the carbon product.

Process (III) is attractive because it provides hydrogen which can be used as a non-toxic fuel, and also provides carbon black, a carbonaceous product, which has numerous uses in industry. A major use of carbon black is as a pigment and reinforcing agent in automobile tyres. It also finds applications as an additive in coatings and plastics, and as a pigment in inks.

Process (III) has been used in methods known in the art. WO99/58614 describes a process in which a fuel gas is thermally decomposed in the presence of low levels of oxygen to produce, as the predominant products, hydrogen gas and carbon black. This is achieved by heating a hydrocarbon fuel to a temperature of about 1000 to 2000° C. in a reactor by introducing flames, typically oxygen-assisted hydrocarbon flames. These local areas of high heat initiate the decomposition reaction of the hydrocarbon fuel. Since some oxygen is present in this process, some conversion of the hydrocarbon fuel into oxidized products (CO, $CO_2$ and $H_2O$) is unavoidable.

WO00/21878 describes an apparently oxygen-free process in which a hydrocarbon gas is thermally decomposed in a reaction chamber containing a finely divided carbon catalyst at a temperature of from 300 to 2000° C. The reaction chamber can be heated by means of external heating coils or heat from other high temperature processes and is operated with a temperature gradient. The inclusion of a carbon catalyst is found to assist in improving the uniformity of the carbonaceous product formed by the decomposition reaction.

WO93/20152 describes an apparently oxygen-free process in which a hydrocarbon gas is thermally decomposed in a reaction chamber. The process described is said to offer improved control of the products produced by incorporating supply channels into the walls of the reactor for supplying hydrocarbon gases to the reactor at temperatures of between 1000 and 2000° C. Plasma torches within the reactor generate decomposition products which act as nuclei for decomposition products formed elsewhere in the reactor. This allows control over the nature and production of the carbonaceous product which is generated.

However, these prior art methods fail to provide optimal hydrogen production. The present invention provides a method which maximizes the $H_2$ generated in a continuous process, reduces reaction time within the reactor which in turn increases throughput, whilst also generating carbon black of high quality in terms of uniformity of particle size.

It has now surprisingly been found that decomposition of a hydrocarbon fuel into hydrogen gas and a carbonaceous product can be achieved with excellent levels of conversion and using a simplified reactor setup. Decomposition occurs at around 1600° C. However, the process of the invention involves heating the hydrocarbon fuel to especially high average temperatures in excess of 2000° C. by radiated heat which uniformly heats the gas. Heating of the bulk hydrocarbon gas to temperatures above 2000° C. has, to the best of the inventors' knowledge, not previously been described. It has been found that heating to a higher temperature increases the kinematic viscosity of the gas which in turn results in laminar flow. This ensures that the fuel flows in a non-turbulent manner and allows the radiated heat to effectively heat all of the gas to high temperatures such that effectively all of the gas is decomposed into its desired reaction products.

Whilst such processes involve higher energy demands compared to conventional decomposition processes making use of temperatures below 2000° C., the inventors have established that higher conversion rates more than offset these energy requirements.

SUMMARY OF THE INVENTION

In one aspect the invention provides a method for producing hydrogen gas and optionally a carbonaceous product from a hydrocarbon fuel, comprising:
  introducing a flowing stream of said fuel into a reaction chamber of a reactor, wherein said reaction chamber has at least one wall and a heating zone which is heated by a heat source,
  heating said fuel in said heating zone to effect pyrolytic decomposition of said hydrocarbon fuel to produce said hydrogen gas and optionally said carbonaceous product;
  wherein the ratio of C:O (mol/mol) in the reaction chamber is greater than 20:1;
  characterized in that the heat source heats the hydrocarbon fuel in the heating zone by radiated heat (by radiative heat transfer) to an average temperature of greater than 2000° C. In an alternative, the present invention provides a method of pyrolytic decomposition of a hydrocarbon fuel, comprising the above method steps.

In a further aspect, the present invention provides an apparatus comprising:
  a reaction chamber having at least one wall and a heating zone which can be heated by a heat source;
  one or more inlets allowing entry of a hydrocarbon fuel stream into said reaction chamber;
  a capture chamber for separating a solid product and a gaseous product; and
  one or more outlets through which gaseous products may leave the reaction chamber;
characterized in that:
  said heat source, when in use, can heat hydrocarbon fuel in the heating zone by radiated heat (by radiative heat transfer) to an average temperature of greater than 2000° C.; and
  the at least one reaction chamber wall has a melting point of greater than 2000° C.

DETAILED DESCRIPTION OF THE INVENTION

The inventors have now established that the decomposition of a hydrocarbon fuel can be achieved in the absence of oxygen with better conversion and uniformity of carbonaceous product and hydrogen yield than is achieved by existing processes. This is achieved by heating the hydrocarbon gas to an average temperature higher than that generally contemplated by methods of the prior art, keeping oxygen content within the reactor at low or negligible levels, and ensuring uniform heating of the hydrocarbon gas by providing radiated heat from a heat source. The process also allows the reactor design to be simplified.

Reactor and General Definitions

The pyrolysis (decomposition) reaction of the present invention is carried out in a reactor (herein also referred to as the apparatus) comprising a reaction chamber. The reaction chamber will typically have at least one inlet for receiving the hydrocarbon fuel. The reaction chamber itself will preferably be an elongate cavity defined by one or more reaction chamber walls. The reaction chamber walls will generally be the same as, and co-extensive with, the reactor walls. A cylindrical chamber is preferred which has a single reaction chamber wall.

A heating zone is present in the reaction chamber. The heating zone typically begins at, or shortly after, the fuel inlet(s) and extends for at least a portion of the reaction chamber, preferably bounded by the reaction chamber wall(s). The portion may consist of more than 50% (e.g. more than 60, 70, 80 or 90%) of the internal area of the reaction chamber. Thus, for example, the heating zone may be described by the area between two parallel cross-sections of the reaction chamber, wherein preferably the reaction chamber wall(s) provides the boundary of the heating zone between the cross-sections. The cross-sections are selected to provide a portion as described above. When a cylindrical chamber is provided, the heating zone may be described by two spatially separated circular cross-sections of the cylinder and the reaction chamber wall.

The purpose of the heating zone is to allow heating of the hydrocarbon fuel (gas) to uniform temperatures at which the gas decomposes into hydrogen gas and carbon black. Heat is provided to the heating zone by radiative heat transfer from a heated object heated by a heat source as described in more detail hereinafter. The portion of the reaction chamber that is heated may be the same as, or larger than, the heating zone. The temperature of the gas within the heating zone is essentially the same throughout the zone (when under heating), or has the variation indicated herein for average temperatures. Thus, some areas of the reaction chamber may be subject to some radiative heat from the heat source, but do not reach the same level of heating achieved elsewhere in the reaction chamber, e.g. around the inlets and outlets or at the extreme ends of the heat source. These areas do not form part of the heating zone.

Radiative heat transfer is achieved by radiated heat or thermal radiation from a surface and refers to heating by radiant heat energy (in the form of electromagnetic radiation) emitted from the surface of a heated object. The object is preferably a solid such as a reaction chamber wall or a heating element. The radiant heat energy emitted is expressed by the Stefan-Boltzmann law.

As used herein, the hydrocarbon fuel stream which has not entered the heating zone of the reaction chamber is referred to as "upstream" and hot gases exiting the heating zone of the reaction chamber are referred to as "downstream". Downstream gases are also referred to herein as "reaction products" and it will be understood that downstream there will exist a mixture of hydrocarbon fuel, hydrogen and carbon black, and possibly just hydrogen and carbon black.

The reactor also typically comprises a downstream capture chamber for separating the carbonaceous product from other products, and one or more outlets through which hydrogen (and any other gaseous products or unreacted fuel) can be removed from the reactor. The capture chamber typically comprises a filter for separating the carbonaceous material from the hydrogen gas. The reactor may also comprise a means for controlling the temperature of the gas (e.g. a means for determining the temperature of the gas with a feedback to the heat source, e.g. the heating element to keep the gas within a pre-determined temperature level).

The inlet(s) and outlet(s) are provided, respectively, upstream and downstream of the heating zone within the reaction chamber. In one embodiment, the reaction chamber is an open-ended cylinder in which the open ends of the cylinder provide the inlet and outlet, respectively (with or without tapering relative to the diameter of the chamber). In this embodiment the heating zone is a portion (e.g. more than 50, 60, 70, 80 or 90% in length or volume) of the cylinder between the inlet and outlet.

The process may be carried out in a single reaction chamber, or may be carried out in two or more reaction chambers (having the features described above) arranged in parallel or series in a single reactor or multiple reactors. The reaction chambers each have their own inlet and outlet. The process may be carried out batchwise or continuously but is preferably operated continuously.

Hydrocarbon Fuel

The hydrocarbon fuel refers to any commercially or readily available hydrocarbons which are gaseous, liquid or solid at a temperature of 20° C. and a pressure of 1 bar, but gaseous at a temperature of 1000° C. and which are susceptible to pyrolytic decomposition. Gaseous and liquid hydrocarbons, especially gaseous hydrocarbons, are preferred over solid hydrocarbons as the latter tend to have a lower proportion of hydrogen by mass. As referred to herein, pyrolytic decomposition (or decomposition) is the thermal decomposition of organic materials without combustion and the involvement of oxygen. Pyrolytic decomposition of methane is as set out in formula (III) above.

It is important that the level of oxygen in the hydrocarbon fuel inputted to the reaction chamber is kept at low or preferably negligible levels. The reasons for this are twofold. Firstly, any oxygen present within the reaction chamber will tend to react with the carbon and hydrogen produced and thereby diminish the yield of the desired products hydrogen gas and carbon black. Secondly, at the especially high temperatures used in the process of the invention, oxygen tends to react with the walls of the reaction chamber. In the case of reaction chamber walls comprising tungsten, a particularly preferred option described in later sections, the inventors noticed the formation of significant amounts of tungsten oxides on the reaction chamber walls when oxygen was included in the hydrocarbon fuel.

The hydrocarbon fuel used in the process of the invention has a ratio of C:O (mol/mol) of greater than 20:1, i.e. C is present in at least 20-fold molar excess. The ratio of C:O is preferably greater than 50:1, especially greater than 100:1. This ratio may be, in some embodiments, greater than 200:1, greater than 500:1 or even greater than 1000:1. Depending on the origin of the hydrocarbon fuel, the fuel may require pre-processing to bring its oxygen content to a suitably low level. This can be achieved by means well known in the art, e.g. an oxygen scrubber.

The nature of the hydrocarbon fuel for use in the invention is not particularly limited so long as the levels of oxygen are kept at a low level. The hydrocarbon fuel may therefore come directly from a gas field or may be subjected to refinement before being used in the process of the invention. In one embodiment the fuel may be a biogas. Most preferably the fuel comprises, consists or consists essentially of methane. In a preferred embodiment the fuel is natural gas.

The hydrocarbon fuel may be supplied to the reaction chamber at, below, or above atmospheric pressure. Typically the fuel will be supplied at atmospheric pressure or above atmospheric pressure and maintained at that pressure in the reaction chamber. A suitable range of pressures for the fuel applied to and/or present in the reaction chamber is between 0.1 and 20 bar, such as between 0.5 and 15 bar or between 1 and 10 bar. Hydrocarbon pressures of atmospheric or slightly above are particularly suitable for use in the invention, i.e. the hydrocarbon fuel may be supplied and/or heated in the reaction chamber at pressures between 1 and 5 bar or 1 to 2 bar, pressures of 1.5 bar±0.5 bar are particularly suitable.

The hydrocarbon fuel is introduced into the reaction chamber as a flowing stream via the one or more inlets. As referred to herein a flowing stream refers to introduction of a volume of gas over a period of time. Preferably the flow rate is constant and a continuous stream is provided to the chamber. However, the flow rate may be varied as appropriate and/or a discontinuous stream of gas may be provided. Conveniently, for a reactor having a total reaction chamber volume of 1 liter, where the total reaction chamber volume is the combined total volume of each individual reactor chamber where a multitude of reaction chambers are used, the hydrocarbon fuel is supplied to the reaction chamber at a flow rate of 25 to 200 liters fuel/minute/liter of reaction chamber, preferably 50 to 100 liters fuel/minute/liter of reaction chamber. These flow rates can be extrapolated linearly for a reaction chamber of any given volume, e.g. for a reactor having a total reaction chamber volume of 1 m$^3$, the total hydrocarbon flow rate may be 25 to 200 m$^3$ fuel/minute, preferably 50 to 100 m$^3$ fuel/minute. These high flow rates ensure that the fuel's passage through the reaction chamber is rapid. Despite this rapid flow pyrolytic decomposition is achieved due to the short reaction times in the method of the invention.

The gas is preferably pre-heated before entering the reaction chamber. Preferably the gas is heated to a temperature which is below its thermal decomposition temperature. Thus, hydrocarbon fuel entering the reaction chamber is preferably heated to a temperature of not more than 1000° C., preferably not more than 900° C. A temperature in the range of 500-900° C. or 600-800° C. is particularly suitable.

Whilst in one aspect the hydrocarbon fuel is heated in the reactor solely by means of the heat source, in a particularly preferred embodiment, the input fuel is heated partially or completely by heat exchange with hot gases downstream from the heating zone of the reaction chamber. Such an arrangement minimises reactor operating expenses and improves fuel production efficiency. Thus in a preferred aspect of the method of the invention heat transfer from hot downstream gases is used to pre-heat hydrocarbon fuel upstream of the reaction chamber. Those skilled in the art will be aware of suitable setups to achieve this thermal recovery. For instance, the fuel inlet can be contacted with a portion of the reactor downstream from the heating zone, e.g. downstream from the heating element (as described in subsequent sections). In one embodiment the pre-heating of hydrocarbon fuel is achieved concomitantly with quenching (cooling) of hot reaction by-products. The reactor (and method) of the invention may also be adapted so that the heating element, when used, pre-heats the hydrocarbon fuel before the latter enters the reaction chamber.

Heating Conditions

In the present invention the fuel (gas) in the heating zone is heated to an average temperature of greater than 2000° C., preferably greater than 2200° C., such as greater than 2400° C. The upper limit of the average temperature is essentially limited only by the temperature resistance of the reaction chamber walls (and any other components which may be present in the reaction chamber, e.g. a heating element) but may be up to 3500° C., such as up to 3300° C. In a preferred aspect the average temperature of the hydrocarbon fuel in the heating zone is in the range of 2000 to 4500° C., preferably in the range of 2500 to 4000° C. The range refers to the range from which the average temperature may be selected, e.g. 2500° C.

The above temperatures are average temperatures. As referred to herein an average temperature refers to the average temperature of all of the gas in the heating zone at any particular time point. Thus, it will be appreciated that different locations within the gas stream may have different temperatures at any particular time point, i.e. some variation in the radial temperature distribution is inevitable. Preferably, however, the variation is as little as possible. Thus, in a preferred aspect the hydrocarbon fuel in the heating zone has different temperatures at different locations and each temperature deviates from the average temperature by not more than 250° C., preferably not more than 100° C.

The temperature within the heating zone can be measured by means known in the art, for instance by the use of a pyrometer or by a dilution method. Pyrometers which can measure temperatures in excess of 2500° C. are commercially available. Alternatively, in a dilution method, a known volume of gas can be withdrawn from a portion of the heating zone and diluted with a known volume of inert gas at a known initial temperature. The temperature of the resulting mixture can be used to calculate the initial temperature of the gas taken from the heating zone.

In the process of the invention the heating of the gas is achieved essentially exclusively by radiative heat transfer from the heated object (heated by the heat source either directly or indirectly), e.g. the heated object may be the reaction chamber wall, to the flowing hydrocarbon gas within the heating zone (though other heat transfer mechanisms may be responsible for some heating of the fuel provided the principal mechanism of heating is radiative heat transfer). Heat transfer pathways between the heated object, e.g. the reaction chamber wall, and the flowing gas by convection or conduction are negligible at the high temperatures used in the method of the invention. When a heat source external to the reaction chamber is used, heat from the heat source may be transferred by conduction to the heated object, e.g. the reaction chamber wall and the gas heated by radiative heat transfer from the heated object, e.g. the reaction chamber wall.

In a particularly preferred aspect, the gas within at least the heating zone of the reaction chamber is preferably isothermal in the radial direction (and preferably the longitudinal direction) in the heating zone, for example it is isothermal in at least one cross-section, e.g. a transverse cross-section, also referred to as the radial direction (and preferably also the longitudinal direction, e.g. a radial or tangential cross-section) in the heating zone of the reaction chamber. For the purposes of the present invention, isothermal is considered to mean that there is no more than 250° C. difference between the minimum and maximum gas temperatures for a given cross-section of the heating zone of the reaction chamber, preferably throughout the whole heating zone or reaction chamber, preferably no more than, e.g. less than, 100° C., preferably less than 50° C.

Whilst only a portion of the reaction chamber need be heated by the heat source, e.g. the portion of the reaction chamber defining the heating zone, decomposition of the heated hydrocarbon fuel may continue downstream beyond the heating zone, e.g. in the non-heated portion of the reaction chamber. The average temperature of the downstream gas (up until temperature quenching) is also preferably greater than 2000° C.

Unlike the decomposition processes described in WO00/21878 and WO93/20152, it is preferred that heating of the gas in the reaction chamber is achieved solely by heat sources which provide radiated heat to the hydrocarbon fuel (e.g. by a heating element located externally to the reaction chamber walls, as described hereinafter). It is essential that no other heat sources are provided to the reaction chamber which provide non-radiated heat (e.g. hydrocarbon flames containing oxygen). This contributes to the simplicity of the reactor design and the achievement of uniform gas temperatures within the reaction chamber. Therefore, the reaction chamber should not comprise inlets for hydrocarbon flames and should also not comprise any heating element which generates non-radiated heat (e.g. plasma torches) within the reaction chamber. It is particularly preferred that there are no heating elements within the heating zone.

Gas within at least the heating zone of the reaction chamber is raised to average temperatures of greater than 2000° C. essentially immediately on entering the heating zone and is maintained at a uniform temperature throughout the heating zone. Regardless of how the heating is achieved (for example, heating element inside, within or outside the reaction chamber wall, heating provided by passing a current through the reaction chamber wall itself, or heating provided by hot gasses surrounding the reaction chamber wall as defined hereinafter), there will be some unavoidable initial lag in temperature elevation as the hydrocarbon gas is initially heated to temperatures of greater than 2000° C. This lag can be minimised by pre-heating the hydrocarbon fuel. It is, however, important that the heat applied in the heating zone is essentially uniform throughout the zone and is not operated with a temperature gradient.

As noted hereinbefore, it is a surprising finding of the inventors that at these especially high temperatures hydrocarbon gases, such as natural gas ($CH_4$), have particularly high kinematic gas viscosities (kinematic viscosity=viscosity/density). The high kinematic viscosity of the hydrocarbon fuel at such high temperatures, coupled with the uniform heating provided by the heat source, e.g. a heating element surrounding the reaction chamber, ensures that the gas flow through the heating zone and the downstream portion of the reaction chamber is laminar rather than turbulent. This may be measured by assessment of the Reynolds number which is lower in laminar rather than turbulent flow. Preferably the Reynolds number is <2300. These factors ensure that gases conducted into and through the reaction chamber in the process of the invention: (i) experience a very uniform temperature history; and therefore (ii) the conversion of the gas into hydrogen and carbon black is improved compared to existing processes because gas cannot escape the uniformly high temperatures within the reaction chamber.

Reaction Chamber

In one embodiment the reaction chamber does not contain any turbulence inducing means. This is yet another distinction over known decomposition processes where it is commonly thought that inducing turbulence is beneficial to achieve uniform temperatures. The present invention achieves highly uniform temperatures in the reaction chamber in a completely different way, without employing turbulence inducing means, by careful control of heating and making use of the high kinematic gas viscosity at such high temperatures. It is particularly preferred that there are no turbulence inducing means within the heating zone.

In the process of the invention the reaction chamber preferably does not comprise any particulate material apart from the carbonaceous product formed from the decomposition reaction occurring in the heating zone. The presence of solid material would be expected to prevent the hydrocarbon fuel achieving isothermal conditions (as described hereinbefore), e.g. in the transverse (radial) or longitudinal directions of the reaction chamber.

In the heating zone and downstream the hydrocarbon fuel decomposes into a hydrogen-rich gas (also simply referred to herein as "hydrogen gas") and carbon black. The reaction chamber is of sufficient length to allow for the majority, preferably all (e.g. at least 90 or 95%) of the hydrocarbon fuel to decompose before the gas is quenched. In embodiments in which the heating zone is provided by a portion of the reaction chamber with a circular cross-section, e.g. a cylindrical portion of the chamber, the ratio between the inner diameter (ID) of the heating zone and the length of the heating zone is preferably 1:5 to 1:80, preferably 1:5 to 1:60, such as 1:10 to 1:40, especially 1:10 to 1:20. By way of example the ratio may be 1:5 to 1:30.

Especially suitable reaction chambers have an ID of 5-100 mm, preferably 10-50 mm, especially 15-35 mm, and internal diameters of about 2 cm are especially suitable. The length of the heating zone is preferably 5-100 cm, such as 10-80 cm, especially 20-60 cm, or 20-40 cm. A particularly preferred reaction chamber comprises a heating zone with an internal diameter of 2 cm and a length of 30 cm. Where a reaction chamber having a variable ID is used the values and ratios in this section refer to the weighted average of the ID throughout the length of the reaction chamber. The total reaction chamber volume of an apparatus comprising a multitude of individual reaction chambers is the sum of the volumes of each individual reaction chamber. For instance, an apparatus comprising 10 individual reaction chambers each having an internal diameter of 2 cm and a length of 30 cm (a reaction chamber volume of ~94 cm$^3$) would provide an overall reaction chamber volume of 940 cm$^3$.

Reaction Chamber Wall and Heating Element Materials

The method of the invention requires heating of the fuel in the heating zone to an average temperature of greater than 2000° C. There are few materials which are resistant to such high temperatures and so to operate at temperatures of >2000° C. requires special consideration for the reactor materials.

The especially high temperatures used in the process of the invention require the use of reaction chamber wall (and preferably reactor) materials which are capable of withstanding temperatures above 2000° C. When an external heat source/heating element is used, the reaction chamber wall material should also have a high thermal conductivity to allow efficient heat transfer to the reaction chamber. Preferably the reaction chamber wall has a thermal conductivity of greater than 1 Wcm$^{-1}$ K$^{-1}$ at 298 K, preferably greater than 1.5 Wcm$^{-1}$ K$^{-1}$, preferably greater than 1.7 Wcm$^{-1}$ K$^{-1}$. The reaction chamber wall material also needs to be capable of preventing leakage of the small H$_2$ molecules from the reaction chamber.

The at least one reaction chamber wall thus comprises or consists of a material having a melting point of >2000° C., preferably greater than 2500° C., preferably greater than 3000° C. This can be achieved by ultra high temperature ceramics, or most preferably, tungsten metal (W). Alternatively, a multilayer structure of W and an ultra high temperature ceramic may be used. In this embodiment, the layer which is facing towards or in contact with hot gases within the heating zone of the reaction chamber is preferably W.

Furthermore, the reactor walls containing the gas, particularly those which are exposed to temperatures in excess of 2000° C. (e.g. the reaction chamber walls) are not porous to gas (particularly H$_2$) at such temperatures.

Most preferably at least the portion of the reactor surrounded by the heating element consists of material with a high melting point, most preferably W. In some embodiments the entire reaction chamber (i.e. the heating zone and any downstream portion of the chamber or reactor) may comprise, consist of or consist essentially of W.

Heat Source/Heating Element

The hydrocarbon gas is heated to exceptionally high temperatures in at least a portion of the reaction chamber referred to as the heating zone. Some suitable methods for achieving high uniform temperatures in the heating zone are described below.

A heat source, as referred to herein, is the source of the heat which provides radiated heat to the hydrocarbon fuel in the heating zone either directly or indirectly. The heat source may be located outside or within the reaction chamber or may be an integral part of the reaction chamber. When providing heat indirectly, the heat source heats a secondary material (the heated object) from which heat may be radiated. This may be, for example, the reaction chamber wall. The heat source may be any source suitable for achieving the temperatures required in the method of the invention, e.g. heat resulting from fuel combustion or electrical heating. In order to achieve uniform heating, a heat source which allows even heat distribution to the heating zone is required. This may be achieved using, for example, electrical elements (e.g. a mesh).

Thus in a preferred aspect the heat source is an electrical heat source, preferably a tungsten mesh. In an alternative embodiment the heat source is non-electrical. For example, the heat may be provided by hot gases produced by reactions, such as flames, or superheated gases heated by means of e.g. plasma arcs, which have an average temperature of >2000° C., preferably >2500° C., preferably >3000° C. Such heat may be used to heat the heated object, e.g. reaction chamber walls, directly or indirectly, e.g. may be positioned outside or within (e.g. inside) reaction chamber walls (where they are not solid). The heated reaction chamber walls then emit thermal radiation to the flowing gas in the heating zone. In this embodiment some of the hydrogen gas produced in the process of the invention may be diverted to the part of the reaction chamber containing the heating zone and mixed with an oxygen source to provide a hydrogen flame which provides heat to the reaction zone via the reaction chamber wall.

Heating sources which do not directly produce radiated heat are not suitable for use within the reaction chamber, i.e. may not be used in contact with the gas in the heating zone. Specifically, if an oxygen source (e.g. a hydrocarbon/oxygen flame) is used to provide the temperatures of >2000° C., then this does not at any stage enter the reactor, but is separated from the reactor by at least the reactor wall/reaction chamber wall.

The heat source may be provided by a heating element. Where a distinct heating element is present, the heating element comprises or consists of a material having an extremely high melting point (greater than 2000° C., preferably greater than 2500° C., preferably greater than 3000° C.). Heat may be generated in said element by, for example, a current being passed through the material. Preferably the material comprises or consists of W. Particularly suitable heating elements include W coils or preferably W mesh. Commercially available W mesh, such as that available from Oxy-Gon Industries Inc. is particularly suitable for use in the process of the invention.

The heat source or heating element may be provided in various locations within the reactor. In a first embodiment the heat source, which is optionally a heating element, may be located externally to the reaction chamber wall surrounding the heating zone. In this case the heat source/heating element heats the reaction chamber wall (the heated object) by conduction, which in turn heats the gas flowing through the heating zone in the reaction chamber by radiative heat transfer, such that the hydrocarbon fuel in the reaction chamber is heated uniformly. Those skilled in the art will readily be able to conceive such a design. It is particularly preferred that the reaction chamber wall, at least in the portion heated by the heat source, e.g. surrounded by the heating element, is substantially spherical in cross section and is surrounded by the heating element.

In this embodiment the heat source or heating element is preferably in direct contact with the reaction chamber wall, although it need not be in direct contact. If not in direct contact the area surrounding the heat source or heating element should be under vacuum or should comprise an inert gas (e.g. nitrogen or Group 18 elements such as helium, neon, argon etc.). The heat source or heating element is preferably isolated from the remaining portion of the apparatus to prevent heat loss. This isolation may be achieved by, for example, efficient thermal isolation and use of a surrounding heat recovery coil which allows heat that would otherwise be lost to be collected and recycled to upstream gases.

In a second embodiment, the reaction chamber wall and heating element materials are as previously defined for the first embodiment but the heat source, which is optionally a heating element, is positioned on the inside of the reaction chamber wall, this may be in direct contact with the reaction chamber wall, and acts (optionally together with the reaction chamber wall) as the heated object from which heat is radiated. In a preferred aspect, in this embodiment, the heating element is not in direct contact with the reaction chamber wall. In this embodiment it is important that the heating element is located appropriately in the reactor so as to heat the gas in the heating zone by radiated heat, and so as not to cause turbulence to the flowing gas. For instance, in this embodiment the reaction chamber may have a circular cross-section defined by the reaction chamber wall and may have a (at least one) heating element located substantially centrally within the reaction chamber and extending in the longitudinal direction, with gas flowing in the cavity defined by the reaction chamber wall and the internal heating element. Under heating the gas in the reaction chamber is heated by radiative heat from the heating element located within the reaction chamber (optionally together with the reaction chamber wall). As noted above only heat sources or heating elements which produce radiated heat without non-radiated heat that may contact the gas to be heated may be used in this arrangement.

In a third embodiment the heat source, which is optionally a heating element (as defined hereinbefore), is located within the reaction chamber wall, preferably in direct contact with the reaction chamber wall which acts as the heated object. In this embodiment the heat source or heating element may sit within layers of the wall or may be embedded within the wall (and optionally in direct contact with the heating zone), for example.

In a fourth embodiment the reaction chamber wall itself acts as the heat source/heating element/heated object, without a distinct heat source or heating element being present either on the internal or external reaction chamber wall. Thus, in this embodiment, for example, current is applied directly to the reaction chamber wall in the vicinity of the heating zone rather than to a separate heating element. In this embodiment the wall in contact with the heating zone is preferably machined to provide a pattern which conducts electricity in pathways which result in a uniform temperature distribution within the heating zone of the reaction chamber.

Quenching

Quenching can be achieved by means known to those skilled in the art, and include cooling of the hot gas by means of heat exchange with a coolant. It is especially preferred than quenching is achieved, at least in part, by means of heat transfer to the hydrocarbon fuel upstream from the heating zone. Due to the endothermic nature of the decomposition reaction, automatic quenching occurs to some extent after the reaction. Quenching may also be achieved by a sudden pressure release downstream, resulting in polytropic or isentropic cooling of the gas.

After quenching of the product stream, the carbon black is typically recovered from the gas stream by means of a filter, sieve or other means (e.g. using a cyclone system or scrubber system), to leave a stream rich in $H_2$ gas. Separation of the solid and gaseous products may be performed in the capture chamber of the reactor. Thus a preferred aspect of the invention provides a further step of separating the reaction products downstream of the heating zone into a solid carbonaceous product and a hydrogen gas, wherein preferably a filter is used.

After collection of the carbon black it may be cooled. Conveniently it may be further treated by milling and/or separation according to particle/agglomerate size to provide a more uniform product. The $H_2$ gas may be sent directly for processing, e.g. GC analysis, purification (from particulate matter), air dilution (for safety) and/or compression or cooling for storage in storage tanks. Thus, in a preferred aspect the method comprises collecting said hydrogen gas and/or said carbonaceous product and optionally cooling said gas to form a liquid or compressing said gas to provide a compressed gas. Additional steps as described above may also be performed. Collection of the products may be performed continually or intermittently during the process. Although the method of the invention typically involves continuously collecting hydrogen, during reactor start up, prior to reactor shut down, or when safety requires hydrogen blow down, any excess hydrogen may be disposed of safely using a "cold flare" method as is known in the art.

Typically the process of the invention will achieve at least 60% conversion to hydrogen (i.e. % hydrogen present in starting hydrocarbon fuel converted to $H_2$ gas), preferably at least 70%, especially at least 80%, at least 90%, at least 95, 96, 97, 98 or 99% or above. Percentage conversion can be measured by methods well known in the art, e.g. gas chromatography.

Products and their Use

The products of the reaction are hydrogen-rich gas and carbon black. As referred to herein, carbon black, also referred to as carbonaceous product, is a particulate carbon material which may contain trace amounts of other elements. The carbon black produced by the method of the invention forms a further aspect of the invention. Advantageously the method of the invention generates uniformly sized carbon particles which provide the carbonaceous product. Carbon particles obtained from the method of the invention preferably have an average particle size in the range of 5 to 40 nm, such as 10 to 30 nm. The physical properties of the carbon black may be altered by modifying the operational conditions of the reactor, e.g. by adjusting the pressure, flow rate etc. of the hydrocarbon fuel. The carbon black has various industrial uses and may be admixed with other materials to modify the physical properties of the material.

The hydrogen gas or hydrogen-rich gas, referred to herein contains hydrogen gas and optionally trace amounts of other gases or elements, but is preferably at least 90, 95, 98 or 99% pure $H_2$. The hydrogen gas produced by the method of the invention forms a further aspect of the invention.

The hydrogen-rich gas produced by the invention may be used in a combustion process for any conventional processes requiring energy. Thus for example, combustion of the hydrogen-rich gases may be linked to a gas turbine combustor, boiler, or other machinery by appropriate modification of the reactor pressure for connection with associated machinery. The reactor and the interior of the reactor are preferably designed and operated at pressures such that utilization of the hydrogen-rich gas in energy systems may be readily facilitated and not require compression of the gas before it is used.

Where the reactor of the invention is heated by means of hot gases and heat transfer via the reaction chamber wall in the heating zone, at least a part of the hydrogen-rich gas produced may be used to provide the fuel for generating the heat, e.g. for a flame to provide the heat source used in the method of the invention.

The invention thus further provides a method of combustion wherein the hydrogen-rich gas produced according to the invention is combusted. This combustion may be performed with an appropriate oxidizer (e.g. air or oxygen) added to the hydrogen-rich gas to produce energy which may then be utilized or may form an integral part of a chemical, metallurgical or similar process. To reduce the production of undesirable combustion products, and hence to reduce harmful emissions to the atmosphere, oxygen-rich oxidizer (preferably pure or essentially pure oxygen) is preferred.

The hydrogen-rich gas may also be used in chemical processes other than combustion to produce hydrogen-containing chemicals.

Methods and apparatuses of the invention may alternatively have as their main purpose the preparation of solid carbon for use in, for example, systems in which the solid carbon is formed into pellets, blocks or as bulk material. Alternatively, the systems may be designed to form fullerences (pellets), diamonds or monodisperse spheres of uniform size. Advantageously, the above methods produce essentially negligible amounts of $CO_2$ and offer environmentally friendly alternatives to conventional processes.

Apparatus

The apparatus of the invention is preferably adapted for performance of the method of invention as described above and preferably comprises the preferred features as described above when discussing the method. Thus, the apparatus preferably has at least one reaction chamber wall, heating zone, heat source or heating element as described hereinbefore. If the apparatus contains an internal heating element, i.e. within the heating zone, in a preferred aspect, this heating element should be located substantially centrally within the heating zone and extend in the longitudinal direction. In preferred aspects of the invention, the apparatus is further adapted to, when in use, recover heat from hot gases downstream from said heating zone to pre-heat hydrocarbon fuel before entering the reaction chamber. The apparatus may further comprise a filter in the capture chamber to separate the solid and gaseous products. The apparatus may comprise a plurality of reaction chambers arranged in parallel or series, e.g. from 2-10, e.g. at least 2, 5, 10 or 20, e.g. not more than 30, 40, 50 or 100, each of which has its own inlet and outlet. In a particularly preferred embodiment, a central reaction chamber may be surrounded by a plurality of (e.g. 4, 6 or 8) other reaction chambers, preferably in a symmetrical arrangement, e.g. in the case of 6 chambers, a hexagonal arrangement.

EXAMPLES

Figure 1:
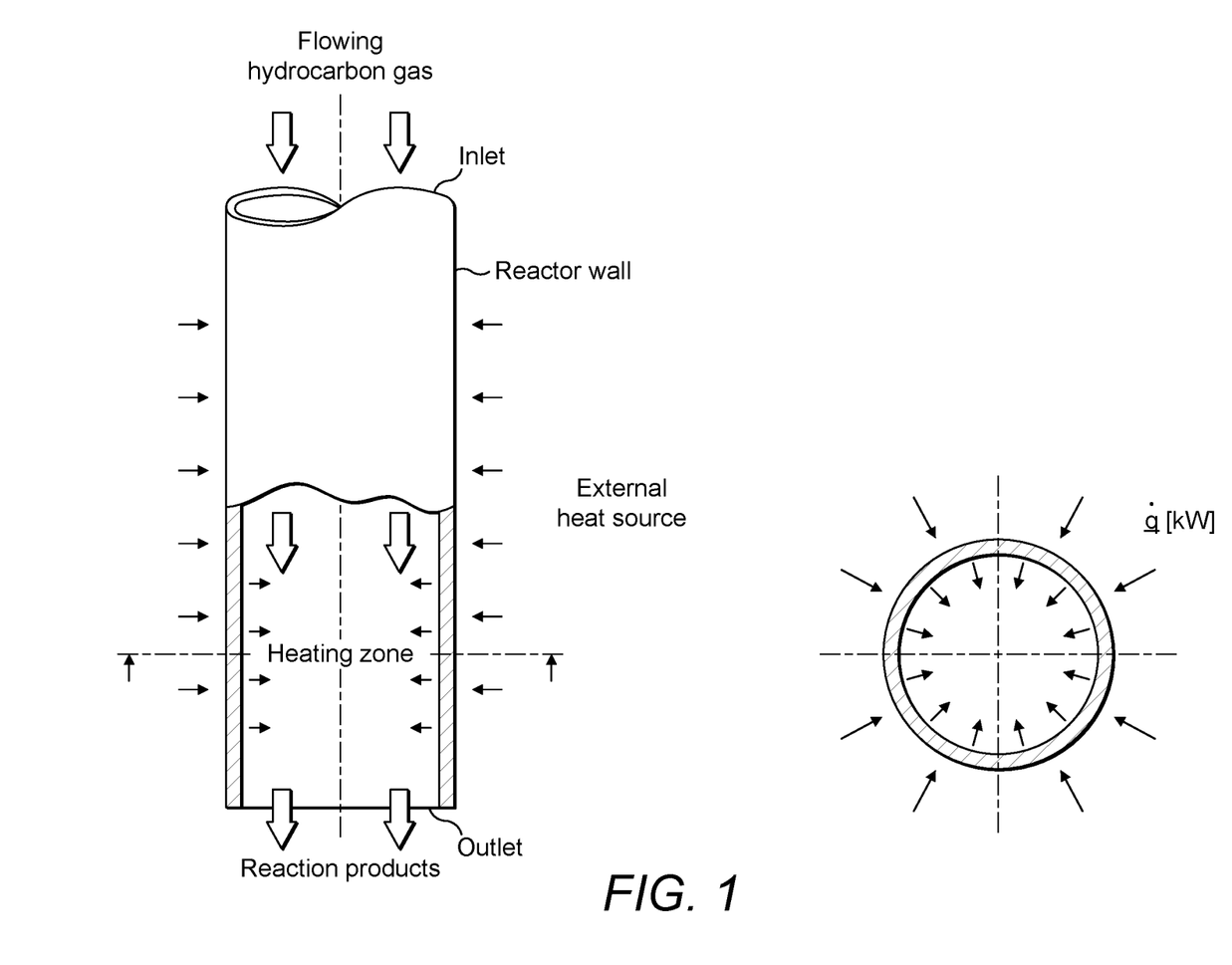
FIG. 1 illustrates the reaction chamber and heating zone in an apparatus (a reactor) of the invention. A transverse cross-section of the heating zone is also illustrated. The reactor walls are heated by an external heat source, and radiate heat towards the flowing hydrocarbon gas.

FIG. 1 illustrates the reaction chamber and heating zone in an apparatus (a reactor) of the invention. In this example methane is introduced via the inlet which is co-extensive with the reaction chamber. Within the reaction chamber, a portion, the heating zone, is heated by an external heat source. The heated reaction chamber wall radiates heat towards the flowing hydrocarbon gas. The radiative heat transfer heats the gas uniformly resulting in decomposition. The products exit from the reaction chamber at the outlet which is co-extensive with the reaction chamber.

The inset illustrates the principle of radiative heat transfer in cross-section.

Figure 2:
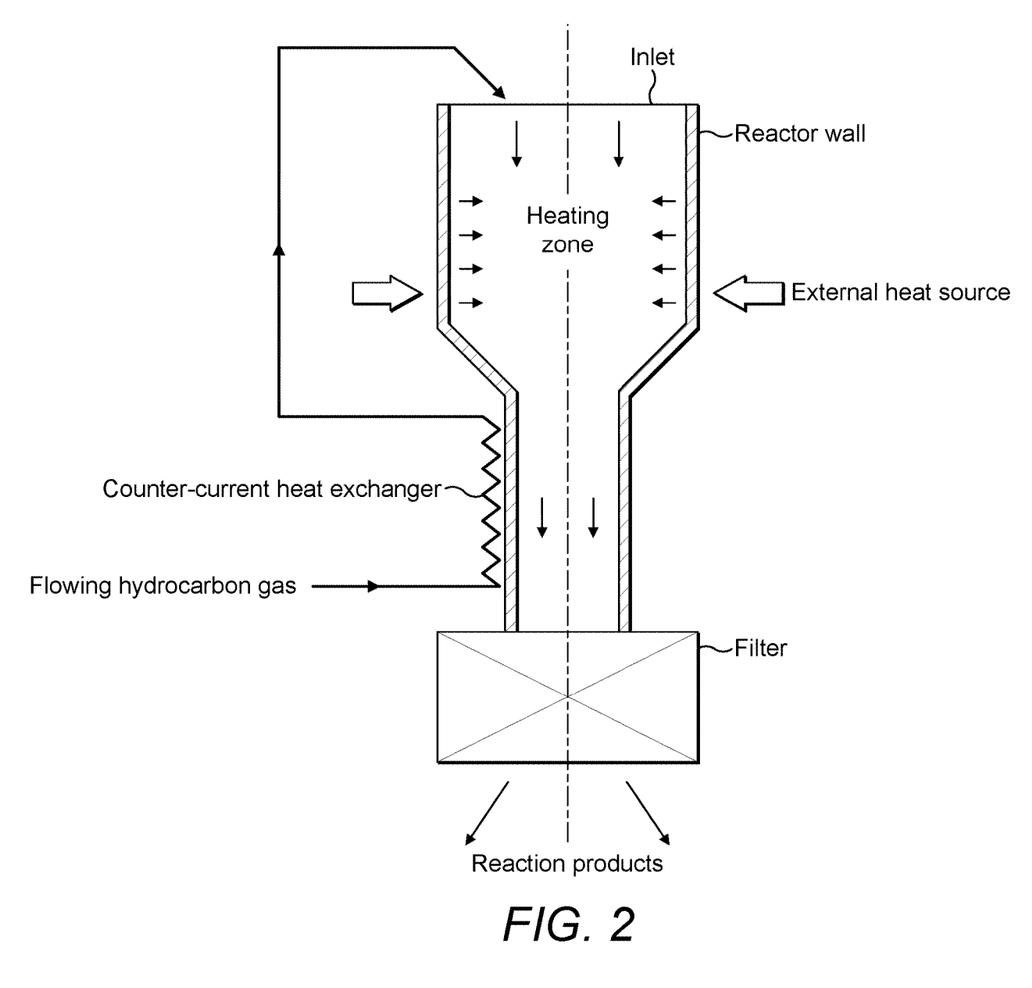
FIG. 2 illustrates an arrangement in which upstream hydrocarbon fuel gas is pre-heated prior to entering the heating zone.

FIG. 2 illustrates an arrangement in which upstream hydrocarbon fuel gas is pre-heated prior to entering the heating zone. In this embodiment the hydrocarbon fuel is fed into the reactor via an inlet (shown at the top of the reactor). The decomposition takes place in the reaction chamber of the reactor and hot gas and solid products exit via the outlet (where they are separated in the capture chamber via a filter). The heat of these products is used by placing a counter current heat exchanger next to the reactor outlet to pre-heat the hydrocarbon fuel on its passage to the inlet.

Figure 3:
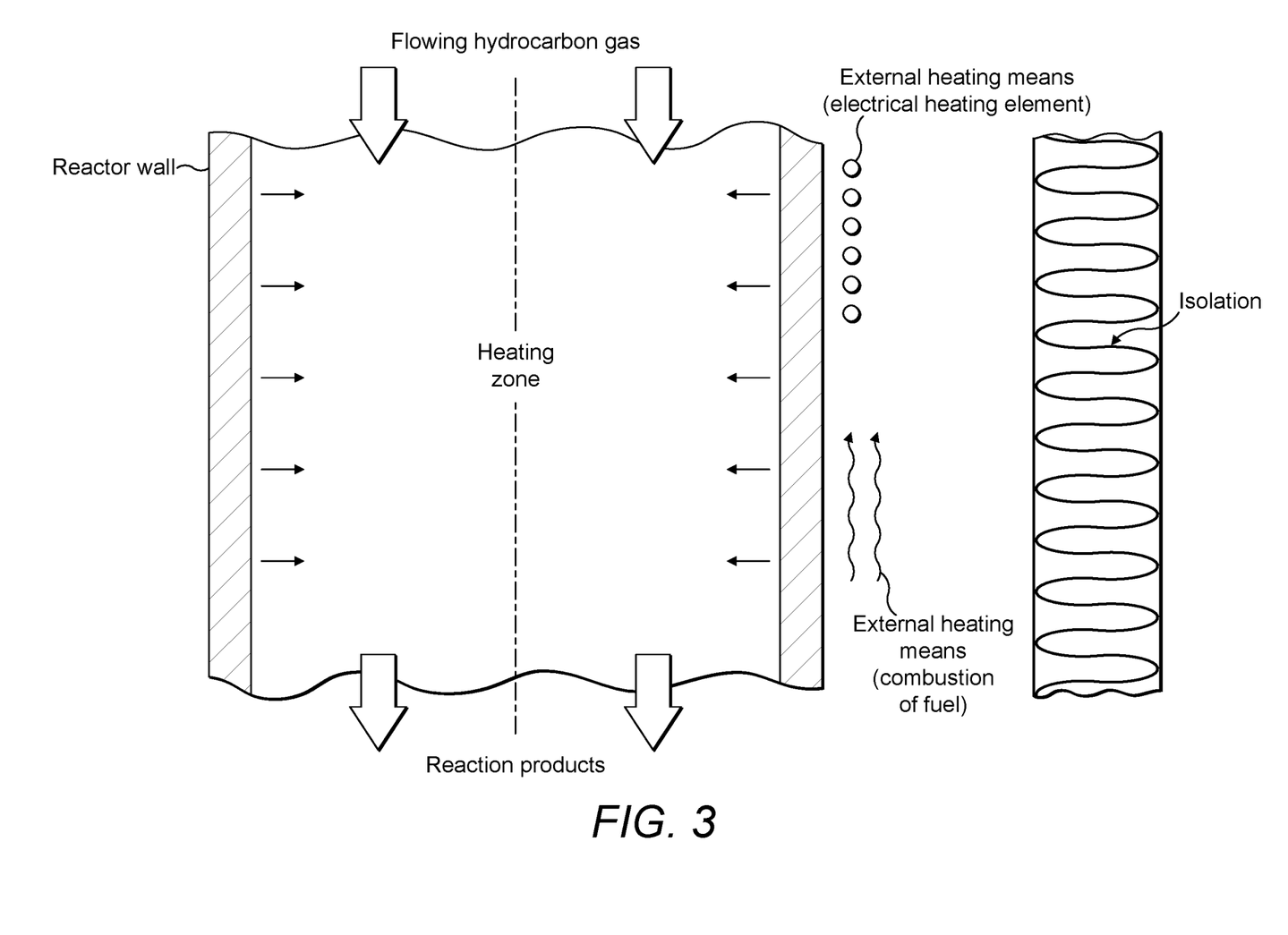
FIG. 3 illustrates a portion of the heating zone in a reactor of the invention. Heating is applied to the reactor wall by means of an electrical element or the combustion of fuel. The reactor can be isolated to minimise heat loss and ensure heat flow by conduction through the reaction chamber wall only.

FIG. 3 illustrates a portion of the heating zone in a reactor of the invention.

Heating is applied to the reactor wall by means of an electrical element or the combustion of fuel. The reactor can be isolated so that heat flow takes place only by conduction through the reaction chamber wall.

Example

Reactor

The reactor comprises a plurality of individual reaction chambers arranged in parallel, with a central reaction chamber surrounded by 6 identical reaction chambers, each reaction chamber formed by a tungsten tube having an ID of 2 cm, a length of 30 cm (individual volume ~94 cm$^3$, total reactor volume 658 cm$^3$) and a thickness of 5 mm. Each reaction chamber is surrounded by W mesh (e.g. from Oxy-Gon Industries Inc.), i.e. the length of the heating zone is 30 cm, which allows temperatures in excess of 2000° C. to be obtained within the heating zone. The reactor comprises a capture chamber with a filter.

Operation

Methane is provided to the reactor via an inlet at a flow rate of 100 L/minute at 1.5 bar pressure which passes to each reaction chamber via an inlet at a flow rate of ~14 L/minute per reactor. The gas in the reaction chambers is heated to >2000° C. by passing a current through the W mesh. Nano-carbon particles are collected in a downstream filter in the capture chamber. The $H_2$ content in the downstream gas, which exits the reaction chambers via their outlets and the reactor via an outlet, is measured by GC and a conversion of above 80% is achieved.

The invention claimed is:

1. A method for producing hydrogen gas and optionally a carbonaceous product from a hydrocarbon fuel, comprising:
introducing a flowing stream of said hydrocarbon fuel into a reaction chamber of a reactor through one or more fuel inlets, wherein said reaction chamber has at least one wall and wherein a heating zone, which is heated by a heat source, is present in the reaction chamber, the heating zone beginning at, or shortly after, the one or more fuel inlets, extending for at least a portion of the reaction chamber and being bounded by the at least one wall of the reaction chamber,
heating said hydrocarbon fuel in said heating zone to effect pyrolytic decomposition of said hydrocarbon fuel to produce said hydrogen gas and optionally said carbonaceous product;
wherein a ratio of C:O (mol/mol) in the reaction chamber after the introduction of the hydrocarbon fuel is greater than 20:1;
wherein the heat source heats the hydrocarbon fuel in the heating zone by radiated heat to an average temperature of greater than 2000° C.,
wherein a difference between a minimum hydrocarbon fuel gas temperature and a maximum hydrocarbon fuel gas temperature throughout the heating zone is no more than 250° C., and
wherein hydrocarbon fuel gas flow through the heating zone is laminar.

2. The method as claimed in claim 1 wherein the ratio of C:O in the reaction chamber after the introduction of the hydrocarbon fuel is greater than 50:1.

3. The method as claimed in claim 2 wherein the ratio of C:O in the reaction chamber after the introduction of the hydrocarbon fuel is greater than 100:1.

4. The method as claimed in claim 1 wherein said hydrocarbon fuel is natural gas.

5. The method as claimed in claim 1 wherein the average temperature of the hydrocarbon fuel in the heating zone is in the range of 2000 to 4500° C.

6. The method as claimed in claim 5 wherein the average temperature of the hydrocarbon fuel in the heating zone is in the range of 2500 to 4000° C.

7. The method as claimed in claim 1 wherein the hydrocarbon fuel in the heating zone has different temperatures at different locations and each temperature deviates from the average temperature by not more than 250° C.

8. The method as claimed in claim 7 wherein the hydrocarbon fuel in the heating zone has different temperatures at different locations and each temperature deviates from the average temperature by not more than 100° C.

9. The method as claimed in claim 1 wherein the at least one wall of the reaction chamber comprises a material having a melting point of greater than 2000° C.

10. The method as claimed in claim 9 wherein the at least one wall of the reaction chamber consists of the material having a melting point of greater than 2000° C.

11. The method as claimed in claim 9 wherein the at least one wall of the reaction chamber comprises tungsten or an ultra-high temperature ceramic having a melting point of greater than 2000° C.

12. The method as claimed in claim 9 wherein the at least one wall of the reaction chamber consists of tungsten or an ultra-high temperature ceramic having a melting point of greater than 2000° C.

13. The method as claimed in claim 1 wherein the at least one wall of the reaction chamber comprises one or more layers of tungsten and one or more layers of a high temperature ceramic having a melting point of greater than 2000° C.

14. The method as claimed in claim 1 wherein the heating zone is provided by a cylindrical portion of said reaction chamber and the ratio of the internal diameter to the length of the heating zone is in the range of 1:5 to 1:30.

15. The method as claimed in claim 14 wherein the heating zone is provided by a cylindrical portion of said reaction chamber and the ratio of the internal diameter to the length of the heating zone is in the range of 1:10 to 1:20.

16. The method as claimed in claim 1 wherein said heat source, which is optionally a heating element, is located externally to said reaction chamber wall, and heats said at least one wall of the reaction chamber from which radiative heat is transferred to said hydrocarbon fuel in the heating zone.

17. The method as claimed in claim 16 wherein said heating element comprises a material having a melting point of greater than 2000° C.

18. The method as claimed in claim 17 wherein said heating element consists of the material having a melting point of greater than 2000° C.

19. The method as claimed in claim 17 wherein said heating element comprises tungsten or an ultra-high temperature ceramic having a melting point of greater than 2000° C.

20. The method as claimed in claim 17 wherein said heating element consists of tungsten or an ultra-high temperature ceramic having a melting point of greater than 2000° C.

21. The method as claimed in claim 1 wherein said heat source, which is optionally a heating element, is located within said at least one wall of the reaction chamber, and heats said at least one wall of the reaction chamber from which radiative heat is transferred to said hydrocarbon fuel in the heating zone.

22. The method as claimed in claim 1 wherein said heat source, which is optionally a heating element, is located internally to said at least one wall of the reaction chamber, and radiative heat is transferred from said heat source to said hydrocarbon fuel in the heating zone.

23. The method as claimed in claim 1 wherein said heat source is an electrical heat source.

24. The method as claimed in claim 23 wherein said heat source is a tungsten mesh.

25. The method as claimed in claim 1 wherein said hydrocarbon fuel is heated in the reactor solely by means of said heat source.

26. The method as claimed in claim 1 wherein heat transfer from hot downstream gases is used to pre-heat said hydrocarbon fuel upstream of the reaction chamber.

27. The method as claimed in claim 1 wherein said hydrogen gas and/or said carbonaceous product is collected and optionally said hydrogen gas is cooled to form a liquid or compressed to provide a compressed gas.

28. The method as claimed in claim 1 further comprising a step of separating reaction products downstream of the heating zone into a solid carbonaceous product and a hydrogen gas.

29. The method as claimed in claim 28 wherein a filter is used in the step of separating reaction products downstream of the heating zone.

\* \* \* \* \*